Figure 1:
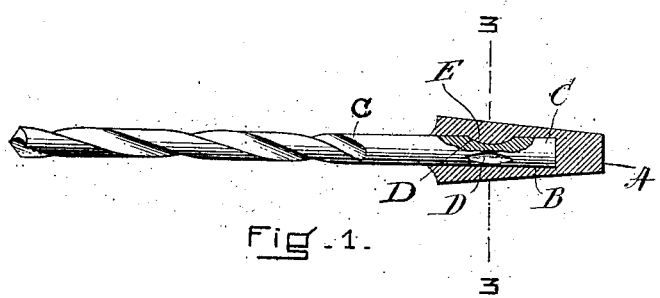

No. 879,631. PATENTED FEB. 18, 1908.
L. GREGSON.
METHOD OF MAKING DRILLS.
APPLICATION FILED DEC. 18, 1907.

WITNESSES: INVENTOR:
E. B. Tomlinson. Lewis Gregson
Patrick J. Bowes. by Browne & Woodworth
attys.

UNITED STATES PATENT OFFICE.

LEWIS GREGSON, OF NEW BEDFORD, MASSACHUSETTS, ASSIGNOR TO MORSE-TWIST DRILL & MACHINE COMPANY, OF NEW BEDFORD, MASSACHUSETTS, A CORPORATION OF MASSACHUSETTS.

METHOD OF MAKING DRILLS.

No. 879,631.  Specification of Letters Patent.  Patented Feb. 18, 1908.

Application filed December 13, 1907. Serial No. 407,031.

*To all whom it may concern:*

Be it known that I, LEWIS GREGSON, a citizen of the United States, and a resident of New Bedford, in the county of Bristol and State of Massachusetts, have invented a new and useful Improvement in Methods of Making Drills, of which the following is a specification.

My invention relates to methods of making two-part drills, or drills of which the bit or boring portion and the shank or the portion whereby the drill is held in the chuck for operation, are formed separately and afterward united.

The object of my invention, which is applicable chiefly to the manufacture of two-part drills of the smaller sizes, is to provide a method whereby the bit and shank of a two-part drill may be firmly united by a joint which will withstand the torsional strains arising from the use of the drill in practice, and whereby in the completed drill the bit will be accurately centered in the shank and the shape of the latter will be maintained true and undistorted.

A two-part drill may be manufactured by my new and improved method much more conveniently and cheaply than by the methods now employed whereby the bit and shank are united by electric welding or by soldering or by means of a pin passing through the members, and in practice the drills made by my method have been found to be as strong and efficient as the much more expensive one-part drill.

Heretofore it has been attempted to make two-part drills by forming a shank with a long rounded extension in which a hole was bored, the butt-end of the bit inserted in said hole and the metal of the extension then compressed upon the bit by two pairs of rapidly rotating hammers provided with die-plates and coöperating pair-by-pair with said rounded extension for securing the bit therein. This method however was found to be objectionable for a number of reasons, chiefly because of the unnecessary amount of metal required for the shank and also on account of the liability of the bit to become loosened in the shank either in the course of manufacture or in use. It has also been proposed, although not, so far as I am aware, prior to my present invention, to manufacture a two-part drill by forming a recess in the butt-end of the bit, inserting said butt-end into a hole in the shank and placing said shank between the dies of a drop hammer, one of which dies was provided with a projection corresponding in shape with the recess in the bit, whereby a portion of the metal of the shank was forced into said recess leaving a corresponding hollow in the face of the shank. This method, however, was found to be objectionable because of the resulting distortion of the shape of the shank, the formation of the aforesaid depression in the face thereof, the inability to accurately center the bit in the shank and the care required to properly adjust the bit in the shank so that the recess in the former would coincide in position with the coöperative projeticon on the die-plate.

The defects above set forth are all obviated by the method which constitutes the subject matter of the present invention and which consists in forming one or more recesses in the bit near the butt-end thereof, forming the shank with an excess of metal, forming in said shank a chamber to receive the butt-end of the bit, inserting said end in the shank chamber, compressing the metal of the shank and thereby swaging the same into the bit recess or recesses, causing any excess of shank metal to flow outwardly in the form of a fin or fins and then removing said fin or fins. By this method there is formed a two-part drill, the shank of which embraces the butt-end of the bit and has an integral projection or projections swaged into and filling said recess or recesses. In the finished drill, the bit is accurately centered in the shank, the shape of the shank is true and undistorted and the outer surface or walls thereof are smooth and not disfigured by a depression or depressions corresponding with the recess or recesses in the bit.

Figures 2, 3:
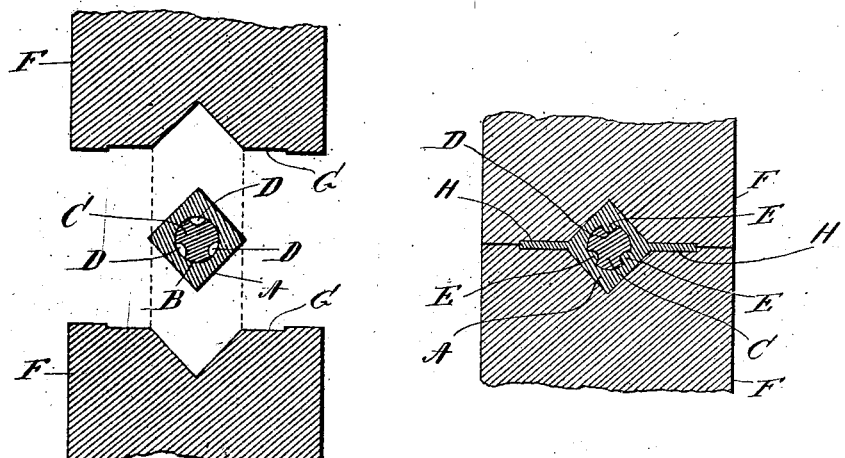
Figure 4:
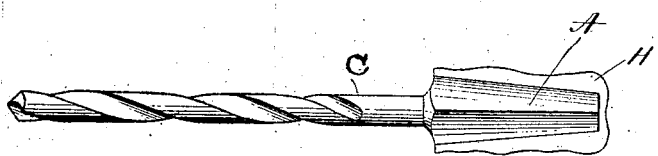
Figure 5:
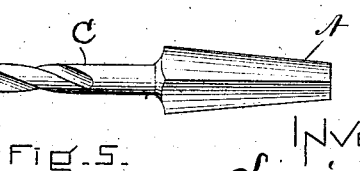

In the drawings which accompany and form a part of this specification and which I have selected for the purpose of more fully disclosing my invention, Figure 1 is a side view partly in section of a drill made by the foregoing method. Fig. 2 is a sectional view of the bit and shank taken on the line 3—3 of Fig. 1 before the shank has been swaged to the bit and showing also a portion of the die-plates. Fig. 3 is a sectional view of the bit and shank taken on the line 3—3 of Fig. 1 after the swaging operation and before the fins have been removed. Fig. 4 is a plan view of the drill after the same has been removed from the die-plates and before the fins have been cut off. Fig. 5 is a plan view of the completed drill.

In the figures, A represents a drill-shank which is of angular cross-section throughout its length and which is preferably square although of course it may be hexagonal, octagonal or of any other suitable shape. The shank is provided with a chamber B into which the bit C, which may be cut from a length of steel wire of standard size, is inserted. The butt-end of the bit is provided with one or more recesses D which may be conveniently formed by means of a grinder. While I have shown three such recesses in the present instance, it will be understood that my method is not limited in this respect.

F F are the dies of a drop-hammer which may be employed for swaging the bit and shank together. These dies conform generally to the shape of the shank A, but, as shown in Fig. 2, the shank is slightly larger than the opening formed when the die-plates are closed. To accommodate the flow of the excess of metal of the shank, the die-plates are formed with longitudinally extending ways G G, so that when the dies close upon the shank, the excess of metal of the shank flows outwardly into the openings formed by said ways producing the fins H H.

When the dies close on the shank with its inserted bit, a portion of the metal of the shank is forced into the recess or recesses of the bit, thereby forming a projection or projections E which are integral with the shank and which prevent the bit from turning in the shank when the drill is in use. In practice it has been found that when the shank is heated to a dull cherry red, a single blow of the drop-hammer will suffice to form the swaged joint between the bit and shank. After this joint has been formed, the drill is removed from the dies and the fin H shown in Fig. 4 is cut off by shearing dies or by other suitable means, thereby producing the finished drill such as shown in Fig. 5.

By providing the ways G to accommodate the flow of the excess of shank-metal when the shank is swaged to the bit, I am enabled to prevent the distortion of the shape of the shank which otherwise would result and to form a shank which conforms exactly to the shape of the opening between the die-plates.

It will be obvious that the shape of the recess and recesses of the bit, as well as the shape of the shank, is immaterial and also that my method is not limited to the apparatus hereinbefore described, but can be carried into effect by a variety of mechanical devices.

I claim:

As an improvement in the art of making two-part drills, the method herein described which consists in forming one or more recesses in the bit near the butt-end thereof, forming the shank with an excess of metal, forming in said shank a chamber to receive the recessed butt-end of the bit, inserting said end in said shank chamber, compressing the metal of the shank and thereby swaging the same into the bit recess or recesses, causing the excess of shank metal to flow outwardly in the form of a fin or fins and then removing said fin or fins.

In testimony whereof, I have hereunto subscribed my name this 13th day of December 1907.

LEWIS GREGSON.

Witnesses:
SETH JAMES BESSE,
ISABEL F. MURPHY.